SIGNAL TRANSLATING DEVICE

Original Filed Sept. 24, 1953 8 Sheets-Sheet 1

INVENTORS
JOHN PRESPER ECKERT, JR.
THEODORE H. BONN
BY Sheldon Kapustin
ATTORNEY

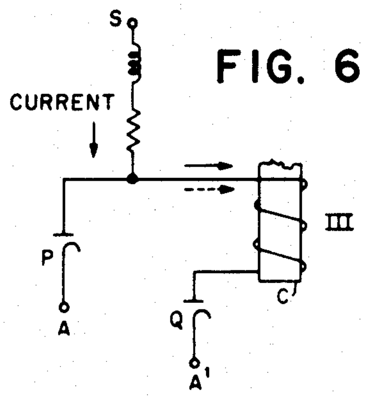
FIG. 6
FIG. 7
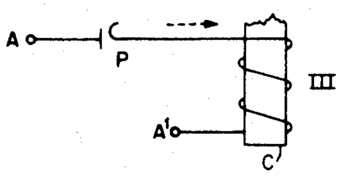
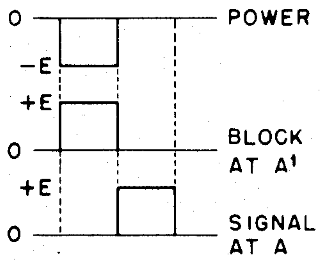
FIG. 7a
FIG. 6a
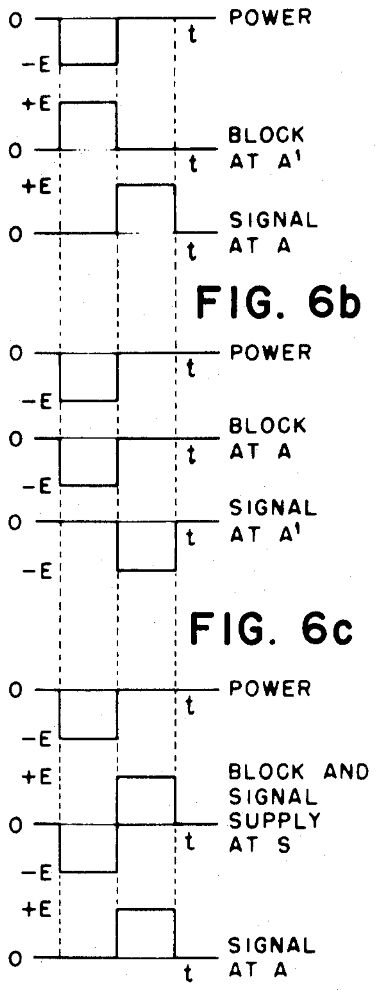
FIG. 6b, FIG. 6c May 31, 1966 J. P. ECKERT, JR., ET AL 3,254,229

SIGNAL TRANSLATING DEVICE

Original Filed Sept. 24, 1953 8 Sheets-Sheet 7

United States Patent Office 3,254,229
Patented May 31, 1966

3,254,229
SIGNAL TRANSLATING DEVICE

John Presper Eckert, Jr., Gladwyn, and Theodore H. Bonn, Merion Station, Pa., assignors, by mesne assignments, to Sperry Rand Corporation, New York, N.Y., a corporation of Delaware Original application Sept. 24, 1953, Ser. No. 382,180, now Patent No. 2,892,998, dated June 30, 1959. Divided and this application Nov. 7, 1958, Ser. No. 772,495
11 Claims. (Cl. 307—88)

This application is a division of our copending application Serial No. 382,180 filed September 24, 1953 now Patent No. 2,892,998.

The invention disclosed herein relates to pulse-type magnetic amplifiers and more particularly to such amplifiers which include a combination delay unit and feed back network interposed between the output and input thereof. A signal from this network applied to the input of the magnetic amplifier can be used in a variety of ways. For example, the feed back signal can be employed to inhibit the effect of a predetermined input signal on the magnetic amplifier or can be used as a continually applied input thereto. By employing a delayed feed back signal, as shall be described, a basic magnetic amplifier may readily be used as a logical element. One such logical element disclosed herein is known in the electronic art as a frequency divider and one of the described preferred embodiments relates to magnetic circuits of this nature. Another logical element employing a delayed feed back signal is also disclosed herein and this element is known as unistable multivibrator or delay flop.

As disclosed in our parent application, amplifiers of the type utilized here may employ ferromagnetic materials. Such materials may exhibit a hysteresis loop and in conjunction with a coil of wire display a high impedance when operating over the portion of the loop from minus residual flux density to plus residual flux density and show a low impedance when travelling from plus residual flux density towards plus saturation flux density. Use can be made of these effects for signal translating and amplifying purposes. A way of using this effect is to produce the desired output when and while the core occupies the high impedance portion of its hysteresis loop. The present invention covers devices using this effect and which may be conveniently referred to as "parallel" signal translating or amplifying devices.

With high working frequencies, many problems are encountered. They may deal, for example, with the speed with which a material can traverse its hysteresis loop, with the transmission of unwanted energy to the input circuits and with the generation of spurious outputs.

It is therefore an object of this invention to provide a new magnetic apparatus.

Another object of this invention is to provide a novel combination of a magnetic amplifier and a delay element.

Another object of this invention is to provide a new signal translating apparatus to be used as a frequency divider.

Another object of this invention is to provide a novel combination of a magnetic amplifier and a delay element wherein the delay element is interposed between the output and input of the amplifier.

Another object of this invention is to provide a new signal translating apparatus to be used as a delay flop.

Other objects and advantages of the invention will become apparent from the following description and the accompanying drawings in which.

Figure 2A:
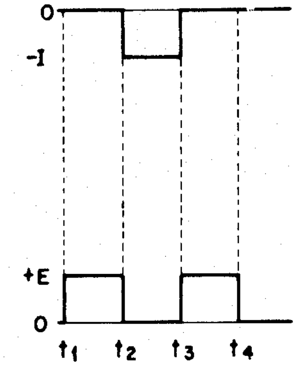
FIGURE 2 shows a basic circuit of a solid-state signal translating device.
Figure 2:
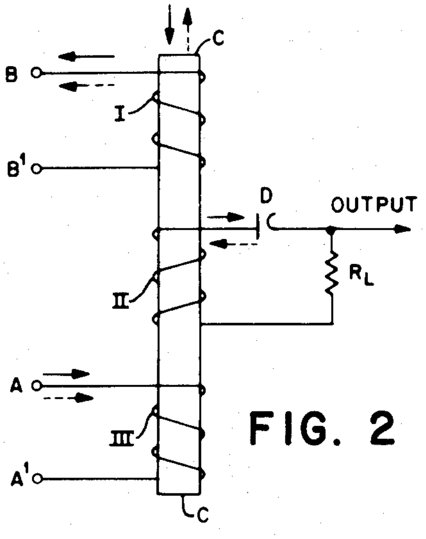
Figure 3:
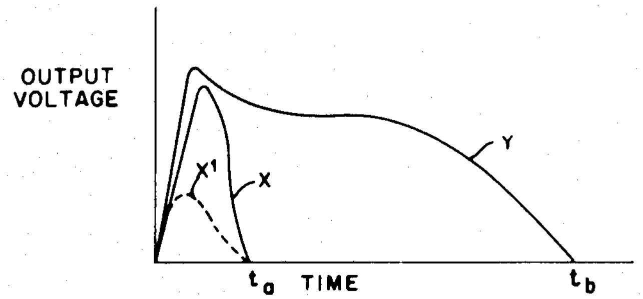
Figure 4:
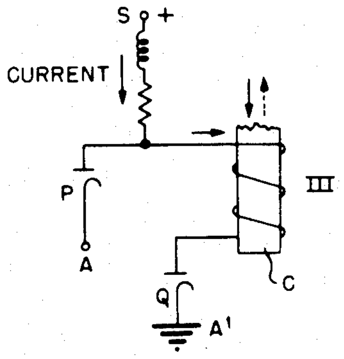
Figure 5:
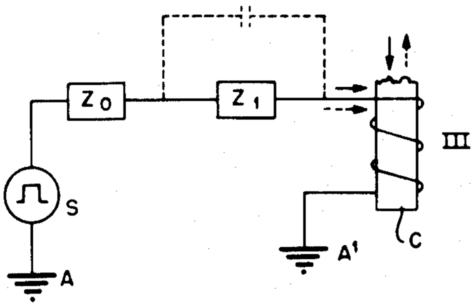
Figure 10:
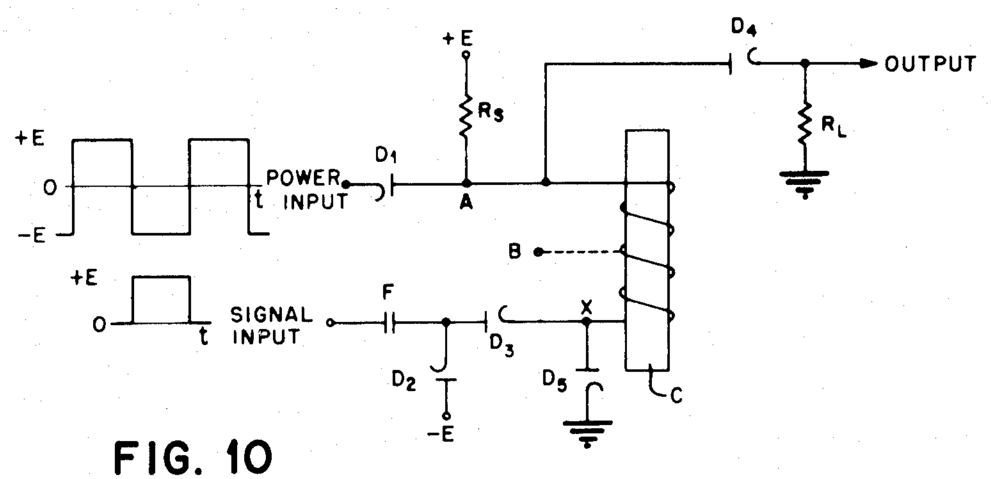
Figure 8:
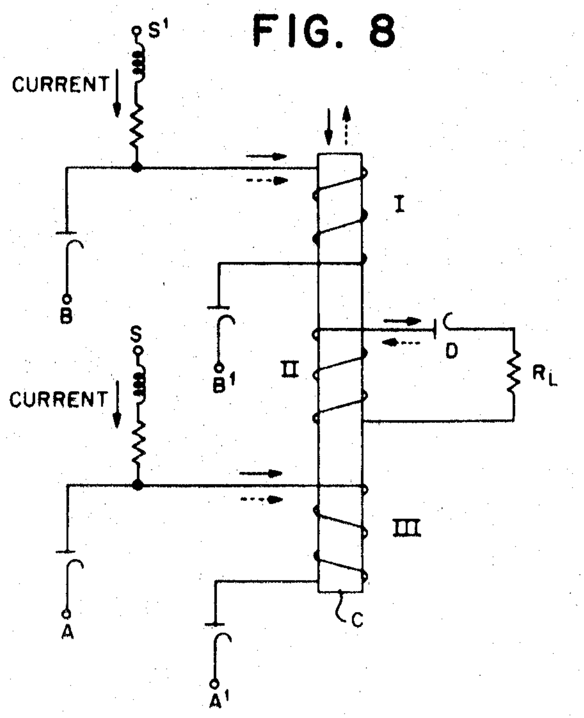
Figure 8A:
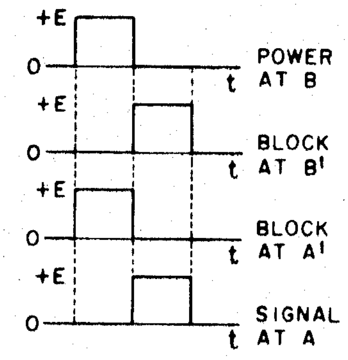
Figure 9:
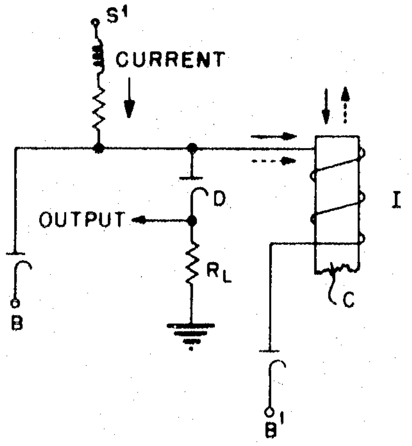
Figure 9A:
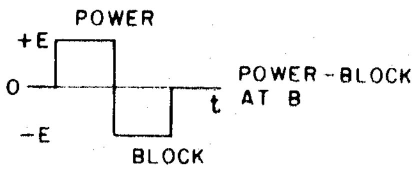
Figure 13B:
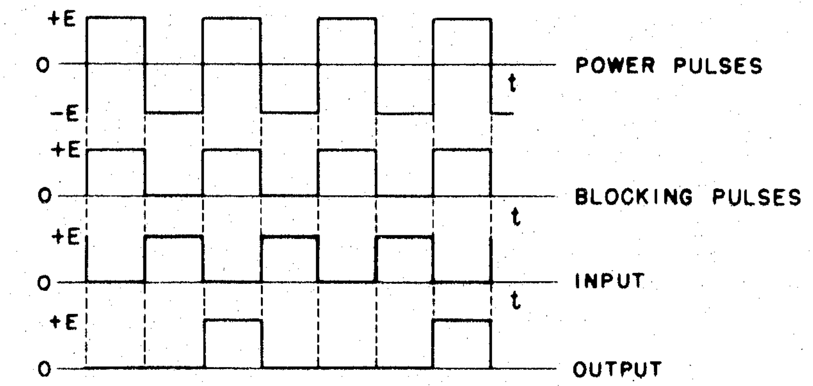
Figure 11:
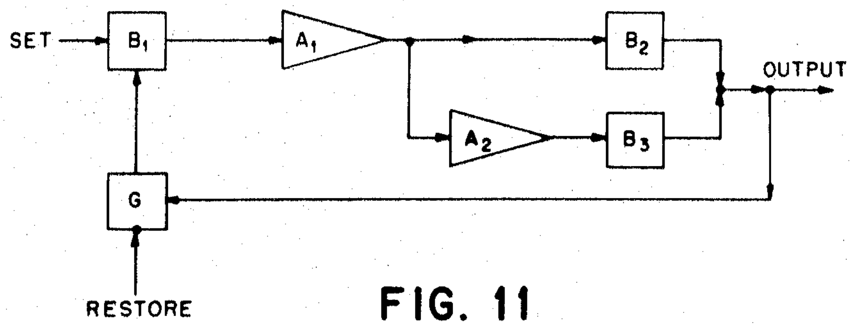
Figure 11A:
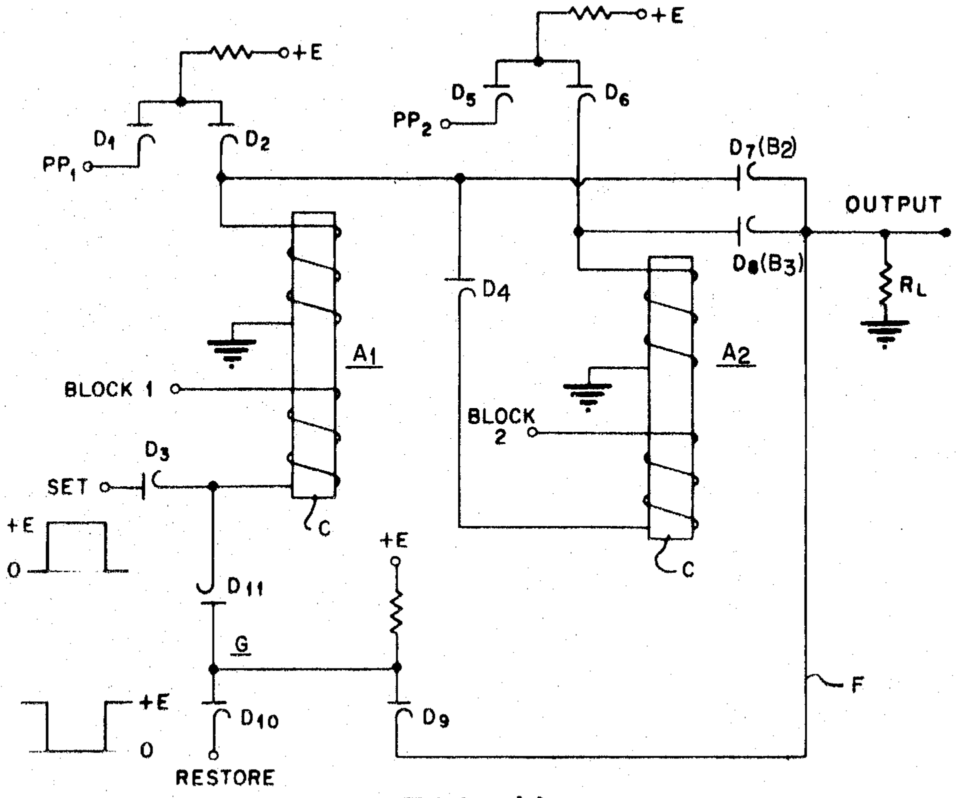
Figure 11B:
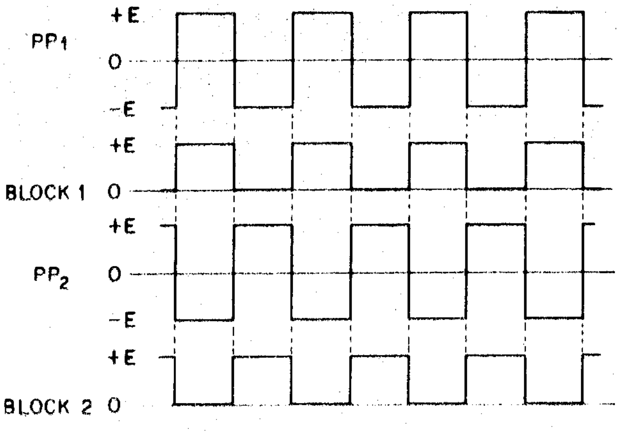
Figure 11C:
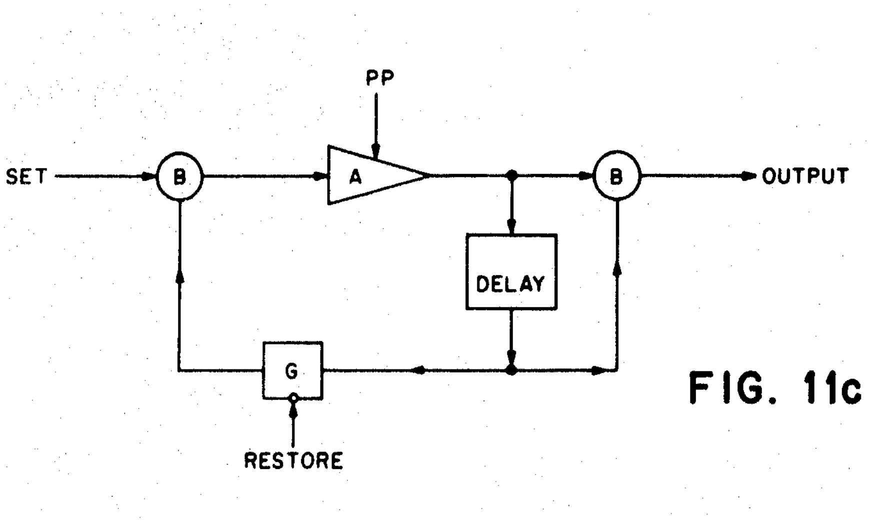
Figure 11D:
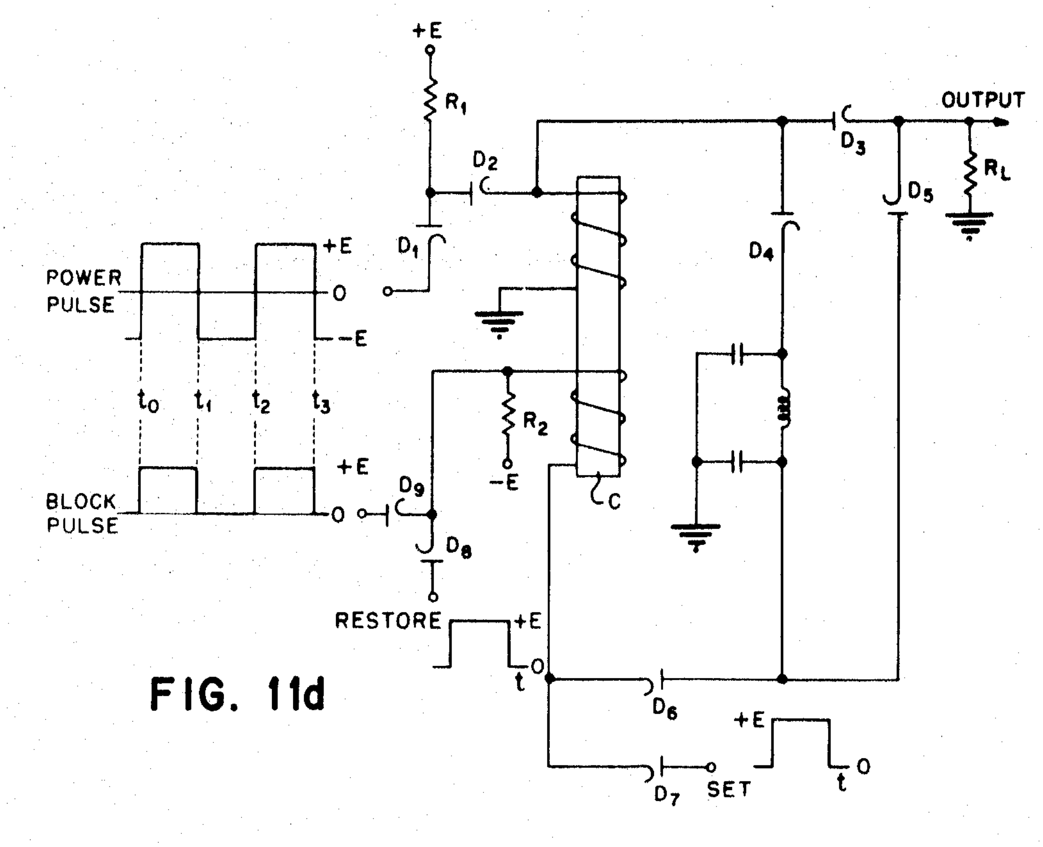
Figure 12:
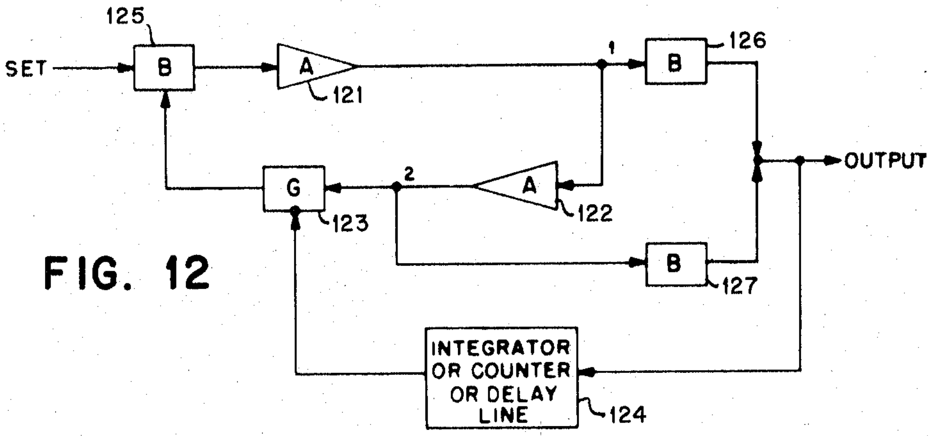
Figures 13, 13A:
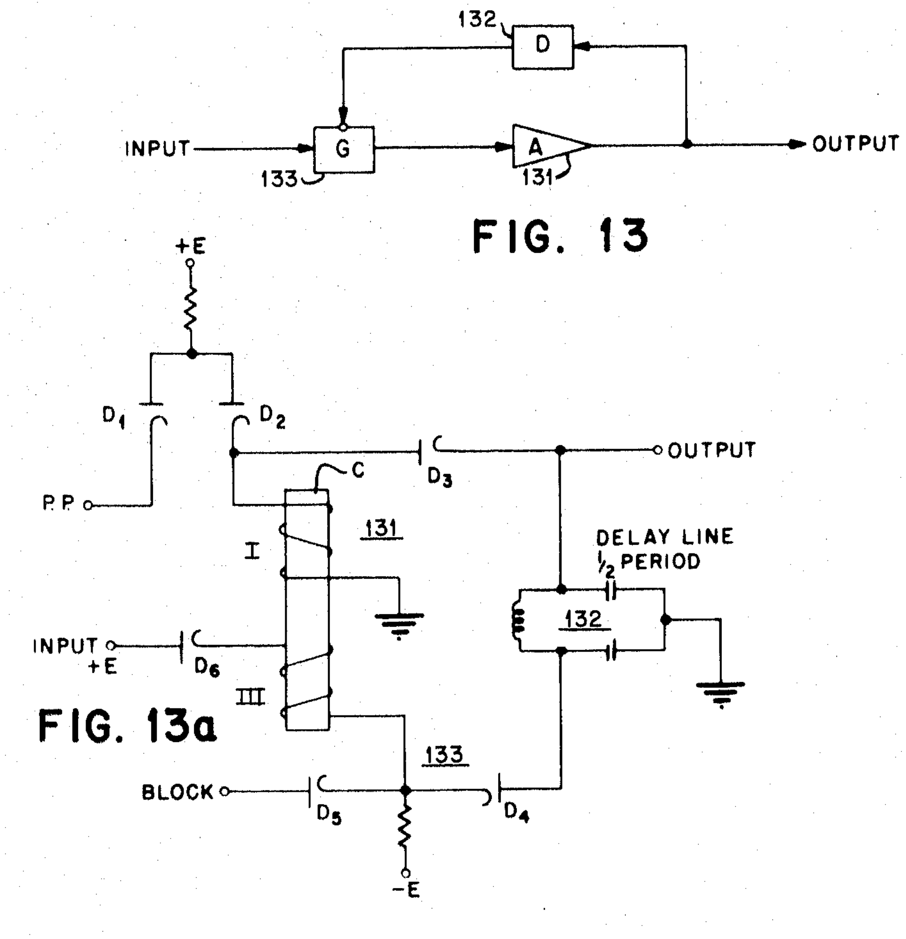

FIGURE 2*a* illustrates the operating time cycle for the embodiment of FIGURE 2;

FIGURE 3 illustrates some representative output wave forms;

FIGURE 4 shows an input winding with a constant current input;

FIGURE 5 shows an input winding with a constant voltage input;

FIGURE 6 shows an input winding to be used in connection with the application of a constant current and the use of diodes and blocking pulses;

FIGURE 6*a* represents a first operating time cycle for the circuit of FIGURE 6;

FIGURE 6*b* represents a second operating time cycle for the circuit of FIGURE 6;

FIGURE 6*c* represents a third operating time cycle for the circuit of FIGURE 6;

FIGURE 7 illustrates an input winding to be used in connection with the application of a constant voltage;

FIGURE 7*a* shows the form of pulses to be applied to the circuits of FIGURE 7;

FIGURE 8 illustrates the three windings of a magnetic signal translating device to which D.C. power may be applied;

FIGURE 8*a* shows the pulse forms to be used in connection with the arrangement of FIGURE 8;

FIGURE 9 illustrates an arrangement in which the output is directly connected to the power winding;

FIGURE 9*a* shows a wave form which serves both as a power pulse and as a blocking pulse;

FIGURE 10 exemplifies the circuits of a single coil magnetic signal translating device;

FIGURE 11 gives a block diagram of a first signal translating system to be used for flip-flop effects;

FIGURE 11*a* represents the schematic diagram for the circuit of FIGURE 11;

FIGURE 11*b* illustrates the power waves and blocking pulses to be applied to the circuit of FIGURE 11*a*;

FIGURE 11*c* gives a block diagram of a second signal translating system to be used for flip-flop effects;

FIGURE 11*d* represents the schematic diagram for the circuit of FIGURE 11*c*;

FIGURE 12 gives a block diagram of a signal translating system to be used for delay flop effects;

FIGURE 13 illustrates in a block diagram a signal translating circuit to be used as a frequency divider;

FIGURE 13*a* shows a schematic diagram for the circuit of FIGURE 13;

FIGURE 13*b* exemplifies the applied power wave forms and block pulses and the resulting output pulses for the circuit of FIGURE 13*a*.

It is to be understood that the invention is not limited to any specific geometries of the cores nor to any specific materials therefor, and that the examples given are illustrative only. The only requisite is that the material possesses a hysteresis loop preferably approaching the idealized hysteresis loop as shown in FIGURE 1.

Before describing the signal translating devices, the terms to be used in regard to different kinds of electric pulses will be defined. There are clock pulses and signal pulses. The signal pulses carry information and are, therefore, selectively applied. It depends upon the information to be transmitted whether such pulses are present or not. The clock pulses are automatically applied and do not carry any information. They may be subdivided into power pulses and blocking pulses. The power pulses usually supply the power for the operation of the signal translating device or, at least, open a gate to permit another source to operate the signal translating device. The blocking pulses block the interference of the power pulse with the signal input circuit and/or of the signal input circuit with the power circuit.

FIGURE 2 illustrates the basic arrangement of parts of a solid-state magnetic signal translating device. Part C is a core of ferromagnetic material. Winding I is the power winding, winding II is the output winding and winding III is the input winding. Power pulses are applied to winding I at, for example, terminal B. The solid arrow at terminal B indicates the direction of current of the power pulse. The solid arrow above core C indicates the direction of flux that this current causes in core C. A typical shape of the power pulse versus time is shown in the wave form of FIGURE 2*a* to the left of terminal B. This power pulse causes a current to flow in the load resistor $R_L$ in the direction shown by the solid arrow near winding II. The power pulse also causes a current to flow in winding III in the direction of the dotted arrow shown at terminal A. When a signal pulse is applied to terminal A of the signal winding, a current is made to flow in the signal winding in the direction of the solid arrow shown near terminal A. The wave form of FIGURE 2*a* to the left of terminal A is a typical wave form which might be applied to terminal A. The vertical lines connecting the wave forms of FIGURE 2*a* indicate the time relationship between the signal input pulse, which may or may not be present at terminal A, and the power pulse which occurs at terminal B.

Figure 1:
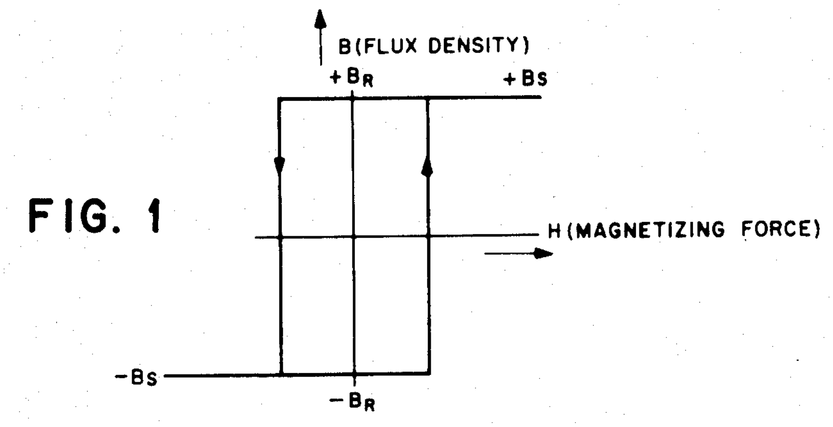
FIGURE 1 is a diagram of an idealized hysteresis loop.

The idealized BH loop of FIGURE 1 is a convenient means for describing the method of operation of the signal translating device. First, it will be assumed that there are no information pulses and that the power pulse is in such a direction as to drive core C from plus $B_R$ to plus $B_S$. In this event, there is a small flux change in the core, and hence an output voltage will be generated which, as a rule, is short in duration and, in the case of some materials, also small in amplitude (sneak pulse).

FIGURE 3 shows representative output wave forms. Wave forms X and $X^1$ are the types which would occur in the case just discussed, namely in the absence of an information pulse preceding the power pulse. The exact size and shape of these wave forms is determined by a number of factors, for example, the slope of the BH loop between $B_R$ and $B_S$, the amplitude and wave shape of the power pulse, the value of the load resistance, the power circuit inductance, eddy current phenomena in the core, distributed capacitances of the winding, etc.

Now, however, it will be assumed that an information pulse has occurred preceding the power pulse. When the preceding power pulse returned to 0, it left the core in the plus $B_R$ position. The information pulse causes the material to travel from plus $B_R$ to minus $B_R$ in a counter-clockwise direction around the hysteresis loop. There is a large change of flux. Any currents which tend to flow in circuit II, the lend circuit, are blocked by the diode D. Therefore, the only power which must be supplied from the information pulse is that power required to move the core from plus $B_R$ to minus $B_R$ and the power transferred to circuit I, the power circuit. Effective means have been found to block power transfer to the power circuit, as will be explained hereinafter. Therefore, the only power consumed from the signal input circuit is the power absorbed by the core in moving from plus $B_R$ to minus $B_R$ in the given time. After the period of time allotted to the signal pulse, the power pulse occurs and the core now starts from minus $B_R$ and proceeds to plus $B_R$. The core undergoes a large flux change and a large voltage is induced in winding II.

Curve Y, FIGURE 3, shows a representative output voltage versus time curve obtained when the material is operated between minus $B_R$ and plus $B_R$. The length of the output signal approximately equals the duration of the power pulse. Note that the current induced, which is in the direction of the solid arrow at winding II, FIGURE 2, is in the direction which will pass through the diode D.

The power delivered to the load may be many times larger than the power required of the information pulse. A net power gain is, therefore, obtainable in the signal translating device. Many factors influence the amount of power obtained. One of the most important factors, however, has to do with the extent to which the unwanted pulse known as the sneak pulse and shown at X or $X^1$ in FIGURE 3, may be tolerated in any practical situation. Another important factor is represented by the ratio of the slope on the steep portion of the hysteresis loop between plus $B_R$ and minus $B_R$ to the slope of the flat portion of the hysteresis loop between plus $B_R$ and plus $B_S$. A material with a rectangular hysteresis loop is desirable for this signal translating device, although by no means completely necessary.

Thus, the fundamental method of operation of this translating device has been shown. When no information pulses are applied, the material goes from plus $B_R$ to plus $B_S$ and returns to plus $B_R$; only a sneak pulse as X or $X^1$ in FIGURE 3 results across $R_L$. When a signal pulse has been received, the material moves from plus $B_R$ to minus $B_R$; an output as Y in FIGURE 3 results across $R_L$, and the material returns to plus $B_R$. Thus, the desired output signal occurs when and while the material travels within the steep middle portion of the loop where the permeability is at its greatest.

A signal translating device operating in the manner just described will be designated hereinafter as an "amplifier." It should be understood, however, that the use of the term "amplifier" is not confined to cases of actual amplification, but extended to cover all devices which produce the desired output signal in response to the application of an input signal, regardless of the fact that the power, current or voltage ratio may be greater than, equal to or less than unity. If, in contrast thereto, the desired output signal is produced in response to the non-application of an input signal, then the device will be called a "complementer."

It also should be realized that the device illustrated in FIGURE 2 as all the other devices described hereinafter operate as so-called "parallel" magnetic amplifiers or complementers. This means that the load circuit or circuits are arranged in a parallel relationship to the core when viewed from the power source, the power being supplied, in the average case, by a constant current source. The desired output signals are produced, therefore, through changes in the residual flux density which, as a rule, follow the path of the hysteresis loop and keep the core within the high permeability region, i.e., between plus and minus $B_R$.

In FIGURE 2, the load on circuit 2 is shown as a resistor. However, this might very well be any passive or active network including resistors, capacitors, inductors, any conceivable combination thereof, computing circuits, buffers, gates and other amplifiers.

In the wave forms illustrated in FIGURE 2*a*, the power pulse is shown occurring coincident with the end of the signal pulse. The time period $t_1$ marks the beginning of the signal puse, $t_2$ marks the end of the signal pulse and the beginning of the power pulse, and $t_3$ marks the end of the power pulse. Actually, $t_1$, $t_2$ and $t_3$ mark the boundaries of the periods allotted to the signal and power pulses and by no means indicate the length of these pulses. The period $t_1$ to $t_2$ may be a relatively long time as, for example, one minute, and the actual signal pulse may have a duration of one microsecond. This one microsecond can occur at any time during the one minute period allotted to the signal. The power pulse, since it always occurs, is given a period equal to its duration. Its duration may be either greater or less than the actual duration of the signal pulse, and it may be applied at any time after the signal pulse. Therefore, this amplifier may also serve as a memory or a delay device. In view of the fact that the power pulse is derived from a source whose wave form can be accurately fixed, output pulses from this amplifier are of standard wave forms as determined by the power pulse source. This amplifier serves also, therefore, as a pulse former and pulse timing device.

In some instances, it may be desirable to obtain the amplifier information at some time which is not necessarily fixed. In this case, pulses applied to coil I may also be selectively controlled information pulses. Then the amplifier functions as a delayed gate. The information pulse applied to coil III selectively allows an output to occur when such output is selectively called for by an information pulse on coil I.

In FIGURE 2, the amplifier is shown with one signal input, one output and one power winding. Actually, a signal amplifier may have many signal input, output and power windings. Thus, it is possible for the amplifier to be operated by one of several sources and/or to operate several loads. These sources and/or loads can have different impedance and voltage levels and different polarities. The number of turns on the various windings would be adjusted to match the characteristics of the particular circuit.

Several input circuits will now be shown to handle the various problems which arise in operating this type of solid-state amplifier with both constant current and constant voltage sources. It should be stressed, in this connection, that the power pulse applied to coil I (the power winding) may, preferably, be taken from a constant current source.

A constant current source is theoretically a source of infinite impedance. A constant voltage source is theoretically a source of zero impedance. These definitions are idealized and are merely used to obtain a simplification in the analyses of circuits. From a practical point of view, the constant current source is a source whose impedance is comparatively high with respect to the load, and a constant voltage source is a source whose impedance is comparatively low with respect to the load.

FIGURE 4 represents a constant current input source which can be used with this type of amplifier. The portion of the core C shown correpsonds to coil III of FIGURE 2. The directions of the currents, voltages, and fluxes shown are the same as those in FIGURE 2. Normally, when no signal is appiled to terminal A, terminal A is at a small negative potential such that the potential on the plate of diode P is zero, and the current from the constant current source S flows through the diode P in series with A, and no current flows through coil III. In order to relax the tolerance requirements on this negative voltage, a diode Q may be inserted as shown in series with terminal $A^1$. If Q is present, the small negative voltage may be larger and diode Q will cut off. Reverse current will thereby be prevented from flowing in coil III. When an input is desired, a positive pulse is applied to terminal A; the diode P, in series with A, cuts off; and the current which formerly flowed through A now flows in coil III in the direction shown by the solid arrow. This principle is also applicable to the means for producing the power pulse. In this case, the actual power source would be the D.C. source of constant current and the source of switching pulses which cause this current to flow in coil III at the required time.

FIGURE 5 shows a constant voltage type of input in which the signal source S is theoretically an impedanceless source. The same portion of the core C as in FIGURE 4 is shown here. $Z_0$ is the internal impedance of a practical source and $Z_1$ is an impedance placed in series with the input coil III of the amplifier. The signal source S is selectively actuated to apply an input pulse. By placing a capacitor, shown dotted, across $Z_1$ a faster change in current can be obtained.

In the previous descriptions, both the signal and the power pulse were shown as square waves. In practice, many wave forms are possible. It is essential, however, that the signal pulse, if selectively applied, is present during the signal period. Whether or not this signal impulse may extend into a power pulse period, depends upon the characteristics of the other elements in the over-all circuit system within which this amplifier is to be used. If the time integral of the signal voltage during the signal period is equal to or greater than $2\times10^{-8}B_RAN$ volts (where A is the area of the magnetic circuit in square centimeters $B_R$ is in gauss and N the number of turns), then full output is obtained from the amplifier. If, on the other hand, the time integral of the signal voltage is less than $2\times10^{-8}B_RAN$ volts, an output proportionately smaller than the full output will be obtained. This effect may be used to make a lower power amplifier without decreasing the volume of magnetic material present. Therefore, it is not necessary, and indeed may not be desirable, that the amplifier operate with the full excursion between plus $B_R$ and minus $B_R$ as stated hereinabove.

One of the important problems connected with these amplifiers is the method of preventing power pulses from delivering energy to the signal input winding and the method of preventing the signal winding from delivering energy to the output winding. Several methods or combinations of methods can be used. One simple case occurs when the power winding is connected to a high impedance source. In this case, the high impedance itself prevents energy transfer from the signal to the power winding. Various combinations of diodes and blocking voltages can also be used on both signal and power windings.

FIGURE 6 is an example of how diodes and blocking pulses can be used to isolate the power winding from the input or the input from the power winding, whenever a constant current source is used for the input winding. (In the case of coil I (the power winding), the application of a constant current source may be regarded as a rule.) The portion of core C containing the input winding as in FIGURE 2 is redrawn in FIGURE 6. A similar arrangement may be used for the power circuit, but the diode corresponding to diode P would not be necessary in such a case, provided that the point corresponding to point S is connected to a device which prevents any back flow of current. The wave forms applied in one method of using this principle are shown in FIGURE 6*a*. The pulse applied to the power winding is shown. At the same time, a positive pulse is applied to point $A^1$ from a blocking source. This cuts off the diode Q in series with $A^1$ and prevents flow of current which, as a result of transformer action, would try to flow as shown by the dotted arrow. The blocking pulse has the same or greater duration as the power pulse and sufficient amplitude to prevent the flow of current. At some later time, as previously described, a single pulse is applied to point A. FIGURE 6*b* shows an alternate method for accomplishing htis result. Here the blocking pulse is applied to the point A and the signal to point $A^1$. In this case, the polarities of both the blocking pulse and the signal are negative.

Another method for accomplishing the same thing is shown in FIGURE 6*c*. The power pulse is the same as previously described. Now, however, a wave form as shown in the second line is applied to terminal S. This wave form is called the block and signal supply because it is of the correct polarity to block during the power pulse period, and it can supply power to the signal winding in the event that a wave form, as shown in the last line, appears at point A. Point $A^1$ would be grounded in this case, and diode P may be eliminated.

FIGURE 7 shows a method of isolating the power pulse from the input when using a constant voltage source. Here again only coil III and part of core C, as in FIGURE 2, are shown. A power pulse is applied as shown in FIGURE 7*a*. During the period of the power pulse, a blocking voltage from a low impedance source is applied at point $A^1$. This acts to cut off the diode P in series with terminal A and prevents current from flowing in the direction of the dotted arrow. This is the direction in which the power pulse would tend to make the current flow. A signal pulse as shown in the bottom wave form of FIGURE 7*a* is selectively applied at point A.

FIGURE 8 shows both D.C. power sources and blocking pulses which can be used on both power and signal windings in an amplifier. A power pulse is applied as shown at point B and the constant current from $S^1$, which normally would flow to B, is made to flow through coil I. Similarly, a blocking voltage is applied at point $A^1$. During the signal period, a positive signal pulse is applied to terminal A and the current from S, which normally would flow through A, is made to flow through coil III. A positive blocking voltage is applied at point $B^1$. Note that if a signal pulse does not occur, the block is applied anyhow so that the signal source does not have to supply power required to block . The application of the block in no way harms the operation of the amplifier.

In the preliminary description of the operation of the amplifier, the output winding was shown as a separate winding II of FIGURE 2 and other figures. However, it is not necessary that this be so. The output may be connected as shown in FIGURE 9, i.e., across the power winding I with the diode D in series with the load $R_L$. The input and output wave forms are the same as shown before. The previously discussed principles, for example, those of FIGURE 8, can be still applied to this circuit. A block such as applied at $B^1$, FIGURE 8, can also be applied at $B^1$, FIGURE 9. A power pulse can be applied at B, FIGURE 9, or if terminal B is eliminated, it can be applied at point $S^1$, as described in connection with FIGURE 6*c*. The power pulse applied at B may also serve as a blocking pulse if it is allowed to go negative, as shown in FIGURE 9*a*. In this case point $B^1$ would be grounded.

A magnetic amplifier may be constructed having only one coil on a core of ferromagnetic material. An example of a single coil magnetic amplifier is shown in FIGURE 10. This amplifier has a constant current applied via resistor $R_S$. During the power period, when the power input has a positive pulse applied thereto, diode $D_1$ cuts off and current flows through resistor $R_S$, the amplifier coil and diode $D_5$, in series, and through diode $D_4$ and the load resistor $R_L$. Assuming that there has been no signal input, the core will be at plus $B_R$ flux density, when the power pulse arrives, and will travel from plus $B_R$ to plus $B_S$, and there will be only a small voltage across $R_L$, and only a sneak output pulse will result.

During the signal input period, a negative pulse is applied to the power input. Diode $D_1$ will connect, and point A will be at the potential of the negative pulse applied to the power input. Diodes $D_4$ and $D_5$ will disconnect, and no current will flow through the amplifier coil. If a signal input is applied at this time through capacitor F, diode $D_3$ will connect, and a current will flow through the amplifier coil in the reverse direction, driving the core from plus $B_R$ flux density to minus $B_R$ flux density. Then, during the next power pulse, the core will travel from minus $B_R$ to plus $B_R$ and a large output will result.

A voltage gain may be obtained from this amplifier by connecting diode $D_3$ to point B instead of point X as shown. In this case it will require less voltage (although more current) to reset the amplifier from plus $B_R$ to minus $B_R$.

FIGURE 11 shows a method of using amplifiers of the type described in connection with FIGS. 8 to 10 for flip-flop effects. An input signal enters amplifier $A_1$ through buffer $B_1$. The signal is amplified and an output is obtained through buffer $B_2$. At the same time, amplifier $A_2$ receives the output from amplifier $A_1$. During the next power period, amplifier $A_2$ feeds amplifier $A_1$ through the gate G and buffer $B_1$. The output of amplifier $A_2$ is buffed through $B_3$ into the output. Thus, a steady output is obtained by buffing the outputs of amplifiers $A_1$ and $A_2$. Either one is always operating, and the flip-flop is set as long as either one operates. The circulating loop must be broken, if and when it is desired to restore the flip-flop, and the gate G is provided for this purpose. If a "restore" or inhibitory signal is applied to gate G at the time that amplifier $A_2$ is delivering the output, no further output will be obtained after the output delivered by $A_2$ has disappeared, and the flip-flop will have been restored. If, however, gate G is located at the input to $A_2$ and the "restore" or inhibitory signal is applied when $A_2$ is delivering an output, the inhibition must last until $A_1$ has delivered its output, and the flip-flop will restore only after $A_1$ has completed its output. In order that the flip-flop might be restored as rapidly as possible, an inhibitory gate operated by the restore pulse could also be placed on the output line. For fastest operation, it would be desirable to have a restore gate at the input to $A_1$, the input to $A_2$ and the output. FIGURES 11a and 11b show a schematic diagram of this flip-flop arrangement and the applied power waves and blocking pulses, respectively.

As shown in FIG. 11*a*, the two amplifiers $A_1$ and $A_2$ are controlled from a pair of phase opposed power pulses $PP_1$ and $PP_2$ (FIG. 11*b*). The output of amplifier $A_1$ is buffed through diode $D_4$ to the input winding of amplifier $A_2$, and through diode $D_7$ to the output load $R_L$. The output of amplifier $A_2$ is also buffed through diode $D_8$ to the output load $R_L$, and through feed back line F to the cathode of diode $D_9$ in the inhibit gate G.

In operation, when the flip-flop has been restored, neither magnetic amplifier $A_1$ or $A_2$ produces an output signal and the voltage across the output load $R_L$ is low. Application of a positive set signal to the set terminal (anode of diode $D_3$) causes amplifier $A_1$ to switch from positive remanence $+Br$ to negative remanence $-Br$ as previously described. The next power pulses ($PP_1$) applied via diode $D_1$ to magnetic amplifier $A_1$ causes that amplifier to experience a flux change as the magnetic core thereof is switched now from negative remanence $-Br$ to positive $+Br$. As a consequence of this change in flux the magnetic amplifier $A_1$ produces a positive output voltage pulse (across its upper winding) which is applied via diode $D_4$ to the input winding of magnetic amplifier $A_2$ and via diode $D_7$ to the common output line connected to load $R_L$. In response to a voltage pulse applied at its input winding amplifier $A_2$ will also produce a positive output voltage pulse when the positive portion of the power pulse ($PP_2$, FIG. 11*b*) is applied thereto. The output pulse produced by amplifier $A_2$ is developed across load $R_L$ and is applied via line F to the cathode of diode $D_9$ in inhibit gate G. This positive pulse is transmitted through gate G (assuming a negative restore pulse is not applied to gate G at diode $D_{10}$) to the input winding of amplifier $A_1$, where this pulse, in a manner similar to the set pulse applied at diode $D_3$, causes amplifier $A_1$ to produce another output pulse. Thus, a continuous flow of output pulses will be circlated through the ring comprising amplifier $A_1$, amplifier $A_2$ and gate G. However, when a negative restore pulse is applied to gate G at the cathode of diode $D_{10}$, any positive output pulse applied to the input of gate G, at diode $D_9$, will be inhibited; that is, will not be transmitted therethrough. Therefore, the application of the restore pulse stops the recirculation of pulses through the ring just described and the flip-flop will be in the restored condition again.

The circuit illustrated in the block diagram of FIGURE 11*c* and the schematic diagram of FIGURE 11*d* differs from the circuit of FIGURES 11 and 11*a* insofar as only one amplifier is employed. Here any well-known pulse delay device may be used to delay an output pulse from the single amplifier for the period of the power pulse applied to this amplifier. At the end of the delay period, the output from the delay device is buffed into the output line and also placed on the input to the amplifier. Thus, a steady output is obtained following the application of an input or set signal, and this output is continued until a restore signal is applied to gate G to inhibit the output from the delay device from reaching the input to the amplifier.

FIGURE 12 shows a device with a delay flop effect. A delay flop is basically a self-restoring flip-flop. This figure shows the use of an integrator or counter to supply the restore pulse. The input to the integrator or counter may be taken from either the output as shown or from point 1 or from point 2. The same considerations as in the case of the flip-flop of FIGURE 11 apply to the placing of the inhibitory gate.

As shown in FIGURE 12 the delay flop in the preferred form comprises in essence a pair of magnetic amplifiers 121 and 122, an inhibit gate 123 and a delay circuit 124. Magnetic amplifiers 121 and 122 may take form of the one, two or three winding amplifiers previously described and inhibit gate 123, as well as delay gate circuit 124 may be any of the well known circuits suitable for such use (for typical inhibit gate and delay line see FIGURE 13*a*). Amplifier 121 is connected to receive at its input a set pulse from an external source or the output of inhibit gate 123 via buffer 125. The output of magnetic amplifier 121 drives the input magnetic amplifier 122 which in turn is connected at its output to one of the two inputs of inhibit gate 123. Inhibit gate 123 transmits the output of magnetic amplifier 122 in the absence of a signal applied at its second input which is connected to an output of delay element 124. Thus, unless delay circuit 124 produces an output, a signal applied to the input of amplifier 121 will circulate through the loop comprising that amplifier, magnetic amplifier 122 and gate 123.

It will be observed that the outputs of both magnetic amplifier 121 and 122 are connected via buffers 126 and 127, respectively, to the input of element 124 and to a common output line. As previously explained each of the amplifiers 121 and 122 may produce an output only coincidentally with the application of a power pulse and each of the amplifiers receives its input signal when the power pulse is not applied (see e.g. FIGURES 10 and 10*a*). Thus, both amplifiers 121 and 122 are driven by power pulses (source not shown) of alternate phase and produces outputs in alternation. If a D.C. output from the delay flop of FIG. 12 is desired then it is only necessary to buff the outputs of amplifiers 121 and 122 as shown by buffers 126 and 127. With regard to the operation of delay element 124 only one of the output signals from either amplifier 121 or 122 need actually be coupled to the input thereof. The only requirement of the delay circuit is that the output signal transmitted thereby (after its inherent delay), be applied to the inhibit input of gate 123 coincidentally with the signal applied to the other input thereof from amplifier 122.

Assuming now that a set signal is applied via buffer 125 to input of amplifier 121 (at a time when a power pulse is not applied to amplifier 121) then this amplifier will produce an output which is applied to the input of amplifier 122 as well as delay element 124. Magnetic amplifier 122 produces an output in response to this input which is applied to gate 123 and transmitted thereby to the input of magnetic amplifier 121 via buffer 125, completing one cycle of signal recirculation. This signal recirculation continues and output pulses may be taken from points 1 and 2 or the common output line. However, gate 123 in the recirculation path will be blocked, i.e. inhibited when the delay element 124 finally transmits a signal to this gate and then the recirculation of signals will cease.

Depending, in large measure, on the particular use of the delay flop of FIG. 12 will be the type of delay element 124 actually employed. For some applications a sonic delay line or integrator will suffice, in others, a pulse counter may be necessary.

A frequency divider may also be adapted from a magnetic amplifier in the manner shown in the block diagram of FIGURE 13.

This frequency divider comprises an inhibit gate 133 connected at its output to the input of magnetic amplifier 131. Signals from the output of magnetic amplifier 131 are taken as the output of the frequency divider and are also fed back via delay line 132 to the inhibit input of gate 133. Gate 133 also receives input signals from an external source, these signals being transmitted therethrough to the input of magnetic amplifier 131 in the absence of an inhibition signal applied to gate 133 from delay element 132.

FIGURE 13*a* illustrates in schematic form the frequency divider of FIGURE 13. While amplifier 131 is shown as comprising two windings, it will be appreciated that either the one winding or three winding magnetic amplifiers previously described can be used. The operation of this amplifier 131 will not be again discussed but reference should be made to the descriptive material relative to FIGURE 9. Delay line 132 is connected to the output of amplifier 131 via diode $D_3$. This delay line 132 is well known in the electronic art and is known as a lumped parametic delay line comprising a plurality of inductors and capacitors. As noted on the figure, element 132 delays signal transmission for one-half a pulse period or a time equal to the duration of the power pulse. The output of delay line 132 is connected to one input of gate 133 at the anode of diode $D_4$. The signal input to this gate is supplied via the anode of diode $D_6$. Although this gate 133 will not be described in detail suffice it to say that a positive signal applied to the anode of diode $D_4$ from delay line 132 will prevent diode $D_6$ from transmitting a concurrent positive input signal to the input winding of magnetic amplifier 131. Diode $D_5$ shown connected to the signal winding transmits a blocking pulse to winding III, which as previously described serves to isolate the winding III from the power pulse winding I when the power pulse is applied to magnetic amplifier 131 via the circuit arrangement comprising the power pulse source (PP) diodes $D_1$ and $D_2$ and the current source comprising a resistor connected to voltage $+E$.

The operation of the frequency divider of FIGURE 13 can best be understood by examining FIGURE 13*b* in conjunction with the aforementioned two FIGURES 13 and 13*a*. FIGURE 13*b* shows the voltage wave forms at various points in the frequency divider. The first two lines of FIGURE 13*b* show the wave forms of the power pulses and blocking pulse respectively applied to the amplifier 131. The third line shows a recurrent wave form of input pulses applied to the gate 133 and the last line shows the output wave form of the frequency divider. It will be observed that positive input pulses (3rd line, FIGURE 13*b*) are applied one-half pulse period after the positive portion of the power pulse, and that only one output pulse (4th line, FIGURE 13*b*) is generated for each pair of input pulses applied at gate 133.

Assuming now that a recurrent wave form of positive pulses is applied to gate 133, then the first of these pulses will be transmitted thereby to magnetic amplifier 131, whereby this amplifier will produce output signals one-half pulse later, i.e. at the same time as the positive portion of the power pulse is applied to magnetic amplifier 131. This output signal is passed to delay element 132 where it is delayed for one-half a pulse period and then applied as an inhibit signal to gate 133 (at diode $D_4$). The inhibit signal is applied at the same time as the second input signal of the recurrent wave form is applied to gate 133 (at diode $D_6$) and accordingly the second input signal will not cause amplifier 131 to produce an output signal. This lack of an output signal will then allow the third input signal applied at gate 133 (diode $D_6$) to cause amplifier 131 to produce an output signal. Thus, it will be appreciated that each of the odd numbered input signals will cause magnetic amplifier 131 to produce an output signal one-half pulse thereafter, and that the even numbered input signals will be inhibited, that is will not pass through gate 133 and will not cause magnetic amplifier 131 to produce an output signal.

Having described the invention, we claim:

1. A magnetic device comprising a magnetic element characterized by having two substantially stable magnetic states, means linked to said element for applying a first magnetizing force to said element tending to drive said element from an initial state and, at a predetermined time after the application of said first force, a second magnetizing force tending to drive said element back towards said initial state, and means linked to said element and responsive to said element being driven from said initial state for inhibiting the effect of said second force.

2. A magnetic device comprising a magnetic element characterized by having two substantially stable magnetic states, means linked to said element for successively applying two magnetizing forces to said elements, each first one of said magnetizing forces tending to drive said element from an initial magnetic state, each second one of said magnetizing forces being applied at a predetermined time after the associated first magnetizing force and tending to drive said element back towards said initial state, and means linked to said element for inhibiting the effect of said second force only when said element is driven from said initial state by said first force and as a result thereof.

3. A magnetic device comprising a magnetic element characterized by two substantially stable magnetic states, means linked to said element for applying pairs of first and second magnetizing forces to said element, each of said first forces tending to drive said element to a first one of said states, each of said second forces being applied a predetermined time after said first force of the same pair and tending to drive said element back to the second one of said states, and means responsive to said element being driven to said first state for opposing the driving of said element back to said second state at said predetermined time.

4. A magnetic device comprising a magnetic element characterized by having two substantially stable magnetic states, winding means linked to said element for applying magnetizing forces to said element, means for applying to said second winding means a first energizing pulse to produce a magnetizing force tending to drive said element from said initial state and, at a predetermined time after said first pulse, a second energizing pulse to produce a magnetizing force tending to drive said element back towards said initial state, and means for applying an energizing pulse to said winding means to oppose said second pulse at said predetermined time and in response to said element being driven from said initial state.

5. In combination, a signal translating device producing an output signal in response to an input signal having a magnetizable core, and an input and an output, a signalling means, an inhibit gate interposed between said signalling means and the input of said device for transmitting signals from said means to the input of said device, and a delay element connected between the output of said device and said gate, said delay element transmitting output signals from said device to said gate for inhibiting the passage of signals therethrough.

6. In combination, a magnetic amplifier having an input and an output, a signal source, an inhibitory gate and a signal delay unit having an input and an output, wherein said signal source is coupled through said gate to the input of said amplifier, the output of said amplifier is coupled to the input of said delay unit, and the output of said delay unit is connected to inhibit the passage of signals through said gate.

7. The combination defined in claim 6 wherein said signal source produces signals at regular time intervals and further including a power pulse source coupled to said magnetic amplifier, said power pulse source producing pulses during the time intervals between signals from said signal source, said amplifier producing an output signal after receiving a signal from said signal source and coincidently with the application of a pulse from power pulse source, said delay element transmitting a signal to said inhibiting gate in response to an output from said amplifier concomitantly with the application of a signal from said signal source.

8. In combination, first and second magnetic amplifiers, each amplifier having an input and an output, a signal source, a signal delaying device and an inhibitory gate for transmitting signal outputs from one of the amplifiers to the input of the other wherein said signal source is connected to the input of said first amplifier, the output of said first amplifier is connected to the input of said second amplifier, the output of said second amplifier is coupled to the input of said first amplifier, the input of said gate is connected to the output of one of said amplifiers, the output of said gate is connected to the input of the other of said amplifiers, the input of said delaying device is connected to the output of said other amplifier, and the output of said delaying device is connected to inhibit the passage of signals through said gate.

9. In combination, a magnetic amplifier having an input and an output, a signal source, first and second signal delaying devices and an inhibitory gate for transmitting signal outputs from said first signal delaying device to the input of said amplifier wherein said signal source is connected to the input of said amplifier, the output of said amplifier is connected to the input of said first signal delaying device, the ouput of said first signal delaying device is connected to the input of said gate, the output of said gate is connected to the input of said amplifier, the input of said second delaying device is connected to the output of said amplifier, and the output of said second delaying device is connected to inhibit the passage of signals through said gate.

10. The combination defined in claim 9 wherein said signal delaying devices each delay the transmission of a signal applied thereto for different time intervals.

11. In combination, first and second magnetic amplifiers each amplifier having an input and a common output conductor, a signal source, a signal delaying device and an inhibitory gate for transmitting signal outputs from one of the amplifiers to the input of the other wherein said signal source is connected to the input of said first amplifier, the output of said first amplifier is connected to said output conductor and to the input of said second amplifier, the output of said second amplifier is connected to said output conductor and to the input of said gate, the output of said gate is connected to the input of said first amplifier, the input of said delaying device is connected to the output of said second amplifier, and the output of said delaying device is connected to inhibit the passage of signals through said gate.

No references cited.

IRVING L. SRAGOW, *Primary Examiner.*

EVERETT R. REYNOLDS, HARRY GAUSS, *Examiners.*

J. J. POSTA, A. T. LANE, M. S. GITTES, *Assistant Examiners.*